H. L. PHELPS.
POWER TRANSMISSION DEVICE.
APPLICATION FILED OCT. 7, 1910.

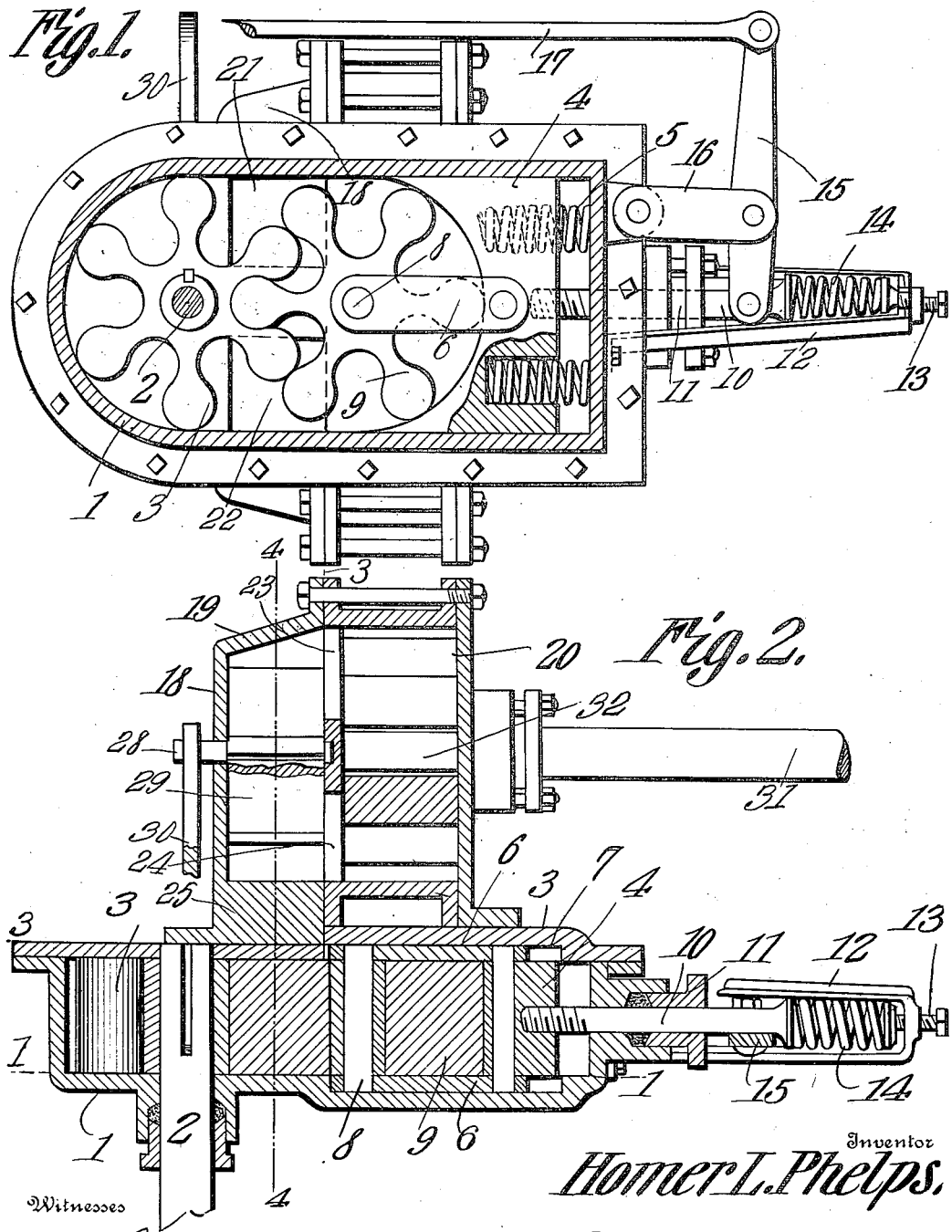

1,005,464.

Patented Oct. 10, 1911.

2 SHEETS—SHEET 2.

Witnesses

Inventor
Homer L. Phelps.
By C. A. Snow & Co.
Attorneys

UNITED STATES PATENT OFFICE.

HOMER L. PHELPS, OF MARTINSBURG, WEST VIRGINIA.

POWER-TRANSMISSION DEVICE.

1,005,464.      Specification of Letters Patent.      Patented Oct. 10, 1911.

Application filed October 7, 1910. Serial No. 585,850.

*To all whom it may concern:*

Be it known that I, HOMER L. PHELPS, a citizen of the United States, residing at Martinsburg, in the county of Berkeley and State of West Virginia, have invented a new and useful Power-Transmission Device, of which the following is a specification.

This invention has relation to power transmission devices and it consists in the novel construction and arrangement of its parts as hereinafter shown and described.

The object of the invention is to provide a transmission device which employs, as a medium for transmitting movement from a driving motor to a driven mechanism a column or plenum of liquid such as oil, or water.

The transmission device is especially adapted to be used upon horseless vehicles, but it may also be used to advantage in other directions.

A further object of the invention is to provide a device of the character indicated which is adapted to automatically adjust itself to develop either power or speed.

With the above objects in view the device includes a pump member having a driving shaft by which it is actuated. Impellers are mounted within the pump member and are provided with intermeshing teeth and spaces. The teeth and spaces are of peculiar configuration, and one impeller is so mounted as to have bodily movement with relation to the other impeller. The movable impeller is held in a normal position under spring tension, as will hereinafter appear. A member having a driven shaft is connected with the pump and is provided with impellers having teeth and spaces of peculiar configuration, and the last said member is adapted to be driven or operated by a column of liquid, oil or water, or their equivalent, which is forced from the said pump, and after operating upon the impellers in the driven member, is returned to the pump.

Figure 3:
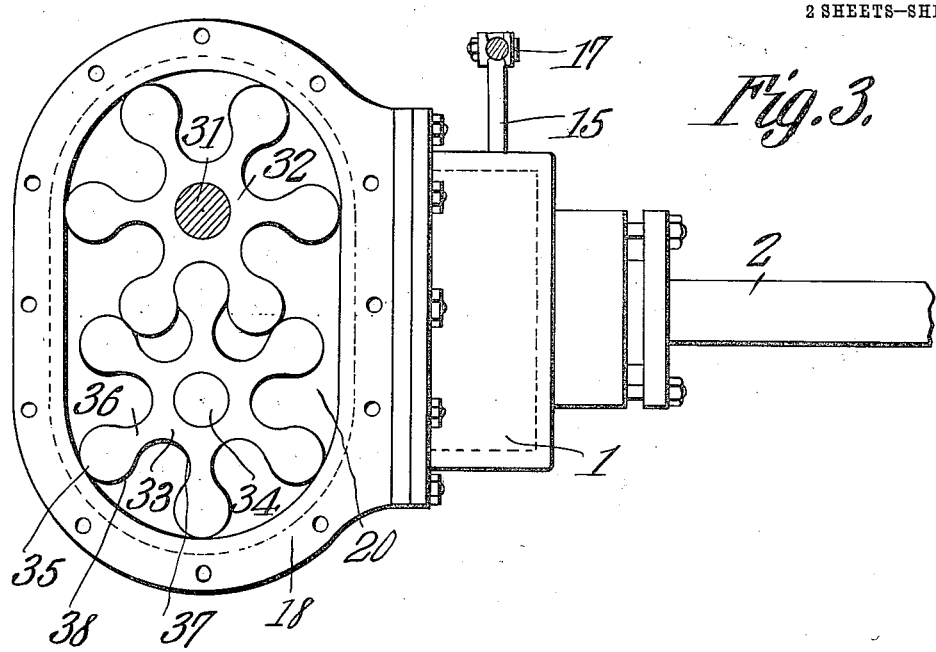
Figure 4:
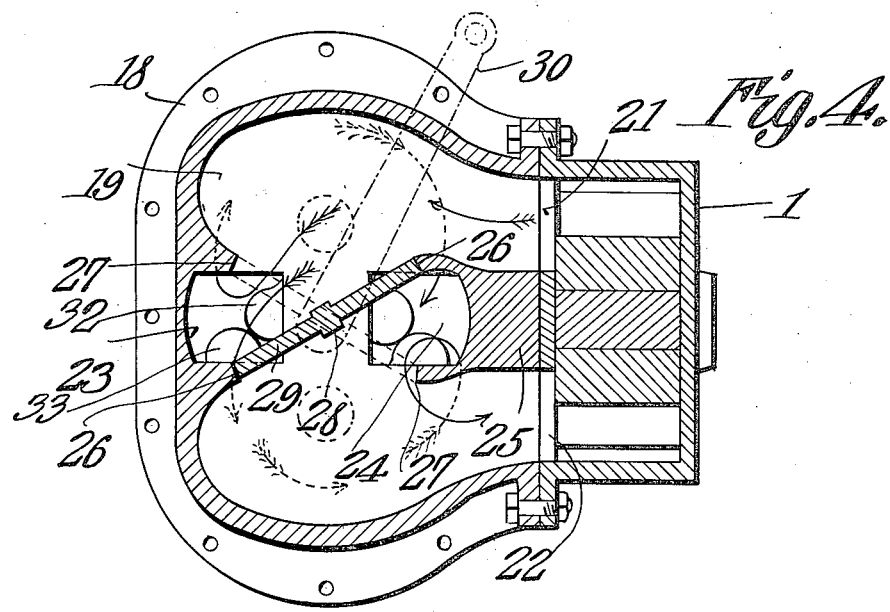

In the accompanying drawings:—Figure 1 is a vertical sectional view, cut on the line 1—1 of Fig. 2. Fig. 2 is a horizontal sectional view of the device. Fig. 3 is a side elevation of the device, with one of the plates removed, viewing the same on the line 3—3 of Fig. 2. Fig. 4 is a sectional view of the device, cut on the line 4—4 of Fig. 2.

The transmission device includes a casing 1, in which a driving shaft 2 is journaled for rotation. An impeller 3 is fixed to the inner end of the shaft 2 and is provided at its periphery with a series of teeth and intervening spaces of peculiar configuration, as will be hereinafter explained.

A block 4 is slidably mounted in the casing 1 and is held toward the impeller 3 by means of coiled springs 5, which are interposed between the said block and one of the ends of the said casing. Links 6 are pivotally connected at their ends with the opposite sides of the block 4 and lie in grooves 7, provided in the sides of the casing 1. A shaft 8 is carried by those ends of the links 6 opposite the ends thereof which are pivotally connected with the block 4, and an impeller 9 is journaled upon the shaft. Said impeller 9 is also provided at its periphery with a series of teeth and intervening spaces of similar configuration to those teeth and spaces provided upon the impeller 3, and to be explained hereinafter. A rod 10 passes through the end of the casing 1, and is connected at its inner end with the block 4. The casing 1, at the point where the rod 10 passes therethrough, is provided with a stuffing-box 11, of the usual pattern. A yoke 12 is mounted upon the end of the casing 1, and an adjusting screw 13 is mounted at the outer intermediate portion of the said yoke. A compression spring 14 is interposed between the end of the screw 13 and the outer end of the rod 10. The working end of a lever 15 is pivoted to the rod 10, and said lever is fulcrumed at the end of a link 16, which, in turn, is pivotally connected to the casing 1. At its power end an operating rod 17 is pivotally connected with the said lever 15.

From the above description it is obvious that by moving the rod 17 longitudinally and swinging the lever 15 upon its fulcrum, the rod 10 may be moved against the tension of the springs 5 and 14, and thus the block 4 may be moved away from the impeller 3. When this occurs the impeller 9 is moved away from the said impeller 3, and consequently, the space between the intermeshing teeth of the two impellers is increased, or a space is provided which will have its effect upon the column of liquid which is operated upon by the said impellers, as will be hereinafter described.

A casing 18 is attached to the side of the casing 1 and is provided with compartments 19 and 20. The compartment 19 communicates with the interior of the casing 1 by means of an outlet port 21 and an inlet port 22. The compartments 19 and 20 communicate with each other through the ports 23 and 24, and the compartment 19 is provided with a diaphragm 25, which, in turn, is provided with valve seats 26 and 27, the said valve seats being arranged in pairs, one member of each pair being at one side of one of the ports connecting the chambers 19 and 20 together, and the members of the other pair of valve seats being located at the opposite sides of the said ports. A shaft 28 passes transversely through the compartment 19 and carries a valve 29, which is adapted to close against either of the seats 26 or 27 of the diaphragm 25. An operating lever 30 is attached to that end of the shaft 28 which projects beyond the side of the casing 18.

A driven shaft 31 enters the compartment 20 of the casing 18, and an impeller 32 is located within the said compartment and is fixed to the said shaft. The impeller 32 meshes with an impeller 33 which is journaled upon a shaft 34, also extending transversely across the compartment 20 of the casing 18. The impellers 32 and 33 have intermeshing teeth with intervening spaces, and the said teeth and spaces are of peculiar configuration, hereinafter to be described. The casing 18 is located in a plane at a right angle to that occupied by the casing 1.

Inasmuch as the intermeshing teeth of the two sets of impellers of the two casings are identical, a description of one will answer for all. Each tooth is formed of a cylindrical outer portion 35, which approximates three quarters of a complete cylinder and is connected by means of a web 36 with the intermediate or hub portion of its respective impeller. The spaces between the adjacent teeth of each impeller are also cylindrical as at 37, but contract toward their outer portions as at 38, in order to receive the web portions 36 of the teeth of the intermeshing impeller.

The operation of the transmission device is as follows:—Presuming that the parts within the casing 18 are in the positions as illustrated in heavy lines in Fig. 4 of the drawings, and that the shaft 2 is maintained in a state of rotation, and the casings 1 and 18 are filled with a plenum of oil or water; as the impellers 3 and 9 rotate the liquid is forced out of the casing 1 through the outlet port 21 thereof into the compartment 19 of the casing 18. The liquid then passes down through the port 23 into the compartment 20 of the said casing 18 and bears against the sides of the teeth of the impellers 32 and 33 and rotates the same. Thus rotary movement is transmitted from the shaft 2 to the driven shaft 31, and from the said shaft 31 the said motion may be utilized in any desired manner. It will also be seen that the shaft 31 is thus caused to rotate in one direction. To cause the said shaft 31 to rotate in the opposite direction the handle lever 30 is swung so that the valve 29 is brought into engagement with the teeth 27 (as indicated in dotted lines in Fig. 4 of the drawing), when the liquid will pass from the compartment 19 through the port 24 into the compartment 20 of the casing 18 and turn the impellers 32 and 33 in a direction opposite to that above described. In the first instance the liquid passes from the compartment 20 through the port 24 into the lower portion of the compartment 19 and again enters the casing 1 through the inlet port 22. In the second instance the liquid passes from the compartment 20 of the casing 18 through the port 23 into the compartment 19 and thence through the inlet port 22 into the casing 1. In both instances the course of the liquid through the casing 1 is the same, as it is also through the compartment 19 of the casing 18; but, in the first instance mentioned the course of the liquid through the compartment 20 of the casing 18 is in a direction the reverse of that in the second instance.

Thus, it will be seen that means is provided for reversing the movement of the driven shaft while the driving shaft is in operation, and that such reversal of movement upon the part of the driven shaft may be accomplished without the use of such mechanism or other complicated mechanical devices, and inasmuch as the movement is transmitted from the driving shaft to the driven shaft through the instrumentality of the plenum of liquid, the reversal or stopping of the driven shaft may be accomplished without knocking or pounding. It will also be seen that by reason of the fact that one of the impellers in the casing 1 is mounted upon a sliding block, the teeth of the impellers 3 and 9 in the said casing may intermesh at varying depths, and thus the quantity of liquid caused to flow from the casing 1 into the casing 18 may be regulated, and, in case the driven shaft is subjected to sudden resistance the shock incident thereto will not be transmitted directly to the driving shaft, for the reason that the impeller 9 may move away from the impeller 3 against the tension of the springs bearing directly and indirectly upon the block 4, and thus provide sufficient space between the intermeshing teeth of the said impellers 9 and 3 to permit the liquid passing from the casing 1 into the casing 18 to move at a slower rate of speed.

By reason of the peculiar configurations of the intermeshing teeth and the intervening spaces of the several impellers the liquid is positively forced from one set of impellers to the other, and the cylindrical end of each tooth forms or acts as a compression or driving piston, while the space of the adjacent impeller which receives the tooth performs the function of a cylinder. Inasmuch as the spaces between the teeth at those points where the surfaces of the adjacent teeth approach the nearest is wider or greater than the transverse sectional area of the web portion 36, sufficient room is provided to permit the liquid to pass between the adjacent intermeshing impellers.

Having described my invention, what I claim as new, and desire to secure, by Letters Patent, is:—

1. A power transmission device comprising a casing, driving intermeshing impellers located in the casing and mounted for lateral relative movement, tension devices for holding the impellers toward each other, a second casing communicating with the first said casing by means of ports, and having adjacent compartments also communicating with each other by means of ports, a valve mechanism located in one of the compartments, driven impellers located in the other compartment, and a plenum of liquid contained within the casings.

2. A power transmission device comprising a casing, driving impellers located in the casing and arranged to have lateral relative movement, a second casing communicating with the first said casing by means of ports and having adjacent compartments communicating with each other by means of ports, a valve mechanism located in one of the compartments of the said casing and adapted to control the flow of liquid through the communicating ports between the compartments, driven impellers located in the other compartment of said second casing, and a plenum of liquid contained within the casing.

In testimony that I claim the foregoing as my own, I have hereto affixed my signature in the presence of two witnesses.

HOMER L. PHELPS.

Witnesses:
E. D. GARDNER.
E. B. KETTERING.